UNITED STATES PATENT OFFICE.

EMIL O. BRICKMAN, OF CHICAGO, ILLINOIS, ASSIGNOR TO ILLINOIS MEAT COMPANY, A CORPORATION OF ILLINOIS.

ART OF PREPARED MEATS.

1,427,438.      Specification of Letters Patent.      Patented Aug. 29, 1922.

No Drawing.      Application filed August 9, 1920. Serial No. 402,317.

*To all whom it may concern:*

Be it known that I, EMIL O. BRICKMAN, a citizen of the United States, residing at Chicago, in the county of Cook and State of Illinois, have invented a new and useful Improvement in the Art of Prepared Meats, of which the following is a specification.

This invention relates to improvements in the art of prepared meats, and more especially to that form of prepared meat known as a loin roll, or Dewey roll, or Dewey ham. In the making of a loin roll as heretofore practiced, two boneless pork loins are placed together with their flat surfaces adjacent, their two curved surfaces forming substantially a cylinder. The cylindrically shaped piece of meat thus made up by the two loins is then bound and tied by a string wrapped around the outer surface and smoked and cooked. It has been found that where a loin roll has been made up in this manner, and afterwards sliced, that the pieces from the two loins frequently become separated. Also, the slicing frequently loosens the string holding the loins together with the result that the whole roll comes apart.

One of the particular objects of my invention is to make a roll which is not subject to the defects pointed out above. By my improved method the two loins are firmly cemented, fastened and held together so that the slices from the roll will remain in one piece, and so that the entire roll will remain firm and solid the same as one piece throughout the slicing process even though the string tied about it is cut or removed. In fact, by my improved process such string may be entirely dispensed with if desired.

In the practice of my invention I take two boneless pork loins the same as ordinarily are used for the making of a loin roll, I then take a piece of pork rind of substantially the same shape as one of the flat surfaces of a loin. I remove all fat from the rind and cook it for two or three hours in boiling water until very tender, and allow it to cool. I then place the two pork loins with their flat surfaces together, with the cooked rind between and press them together very firmly in order to make a complete contact between the surfaces. The cooked rind between the meat surfaces acts as a cement to a certain extent and tends to hold the meat pieces togther. The whole is then ready to be cooked. Since the cementing action at this stage is not very strong a string may be tied around the whole or it may be placed in a metal container in order to assist in holding it in shape for the cooking process. The roll is then cooked in the usual manner and afterward smoked or not as desired; or it may be smoked first and then cooked. Where it is smoked first, however, and a metal container is used to assist in holding the meat pieces together temporarily it is obvious that such container must be provided with sufficient openings to furnish access for the smoke to the meat. The roll may be sold either before or after the cooking of the whole. Where sold before cooking it is advisable to bind the roll with string or otherwise assist in holding the meat pieces together because the interposed rind does not develop its full cementing properties until after the entire roll has been cooked. It is obvious, however, that such string may be dispensed with if it is found that the raw meat pieces are sufficiently held together by the rind, or if the purchaser is cautioned to see that they are properly held in place until the whole is cooked.

The pork rind between the loins, through the cooking of the prepared roll develops its full cementing properties and binds, ties and cements the loins firmly together. The binding string or metal container may then be removed and the roll will be found to retain its shape, and not come apart during the slicing process. Each slice also will remain one piece. It is obvious, however, that the binding cord may be left on if desired, since its presence will do no harm. The cooking also serves to reduce the rind to a certain extent causing a partial absorption of it into the adjacent meat surfaces so that slices from the completed roll will show only a very fine line indicating the location of the rind. The cooking of the rind itself for two or three hours before its use in the roll as described above, has made it very tender; and a further cooking of the roll and a partial absorption of the rind has made it more tender, so that no toughness is detected in eating slices from the roll.

Since the rind thus used to cement the loins together is of pork, there is no foreign flavor. The use, as described, of a pork rind for such cementing purposes in the place of any other kind of cementing material, is of great advantage because the pork rind is not a foreign substance, the use of which is restricted or regulated by some pure food laws.

Although I have described a roll made up of two pork loins it is obvious that more may be used if desired. In fact, any number may be cemented together by placing such a sheet of rind between each two adjacent surfaces.

Although I have described my invention as applied to the making of loin rolls, it is obvious that it may be used in connection with any other kind of meat, fowl or fish, in any case where it is desired to fasten two pieces together. Also, the use of such pork rind in connection with fowl and fish, would add a pleasing and desirable flavor if its presence could be detected by the taste at all. In this connection it is to be noted that the cooking of the rind preliminary to its use as a cementing material very nearly or entirely removes its taste. It is obvious that such cooking could be somewhat shorter or longer in order that more or less of the taste be retained if desired.

Although I have disclosed the use of pork rind in explaining my invention, it is obvious that, without detracting from the spirit of my invention other rinds having the same, or suitable cementitious properties may be used if desired.

What I claim as new and desire to secure by Letters Patent is:

1. A prepared meat comprising a plurality of meat pieces fastened together by sheets of edible cementing material interposed between adjacent surfaces.

2. A prepared meat comprising a plurality of meat pieces having adjacent flat surfaces, said meat pieces fastened together by sheets of edible cementing material interposed between the adjacent surfaces.

3. A prepared meat comprising a plurality of meat pieces having adjacent flat surfaces with cooked meat rind interposed between said surfaces.

4. A prepared meat comprising a plurality of meat pieces with cooked meat rind in sheet form interposed between adjacent surfaces.

5. The method of preparing meat by combining a plurality of pieces thereof together with sheets of edible cementing material placed between adjacent surfaces.

6. The method of preparing meat by combining a plurality of pieces thereof together with sheets of cooked meat rind placed between adjacent surfaces.

In testimony whereof I have hereunto placed my hand and seal this 20th day of July, 1920.

EMIL O. BRICKMAN.